United States Patent
Jörimann et al.

(10) Patent No.: US 12,209,981 B2
(45) Date of Patent: Jan. 28, 2025

(54) METHOD AND DEVICE FOR SENSORY MEASUREMENT OF A MATERIAL SAMPLE

(71) Applicant: Mettler-Toledo GmbH, Greifensee (CH)

(72) Inventors: Urs Jörimann, Bertschikon (CH); Urs Wüst, Hombrechtikon (CH); Andreas Dängeli, Winterthur (CH); Moosa Abrahams, Greifensee (CH)

(73) Assignee: Mettler-Toledo GmbH, Greifensee (CH)

( * ) Notice: Subject to any disclaimer, the term of this patent is extended or adjusted under 35 U.S.C. 154(b) by 741 days.

(21) Appl. No.: 17/444,581

(22) Filed: Aug. 6, 2021

(65) Prior Publication Data
US 2022/0042939 A1 Feb. 10, 2022

(30) Foreign Application Priority Data
Aug. 7, 2020 (DE) .............................. 102020004838

(51) Int. Cl.
*G01K 17/04* (2006.01)
*G01N 25/48* (2006.01)

(52) U.S. Cl.
CPC ......... *G01N 25/4866* (2013.01); *G01K 17/04* (2013.01)

(58) Field of Classification Search
CPC ..... G01N 25/4866; G01K 17/04; G01G 23/01
See application file for complete search history.

(56) References Cited

U.S. PATENT DOCUMENTS

| | | | |
|---|---|---|---|
| 6,146,013 A | 11/2000 | Huetter et al. | |
| 6,535,838 B2 | 3/2003 | Abraham et al. | |
| 6,576,849 B2 * | 6/2003 | Bliss | G01G 23/01 |
| | | | 177/199 |
| 8,668,380 B2 | 3/2014 | Schenker | |
| 9,587,974 B2 * | 3/2017 | Wechselberger | G01G 23/3735 |
| 2021/0131936 A1 * | 5/2021 | Tomita | G01N 5/04 |

FOREIGN PATENT DOCUMENTS

| | | |
|---|---|---|
| JP | H10-318954 A | 12/1998 |
| JP | 2008-292290 A | 12/2008 |
| WO | 99/27354 A1 | 6/1999 |

OTHER PUBLICATIONS

Dearden, H.T., Comparison Alarms for Detection of Measurement Faults, Measurement and Control, Nov. 2014, pp. 273-275, vol. 47, No. 9, The Institute of Measurement and Control.

* cited by examiner

*Primary Examiner* — Randy W Gibson
(74) *Attorney, Agent, or Firm* — Standley Law Group LLP; Jeffrey S. Standley; Adam J. Smith

(57) ABSTRACT

In association with a method and a device for sensory measurement of a material sample, a measurement curve is used to detect deviations from the regular measuring characteristics of the device. A corresponding file can be made available to a service technician for evaluation.

19 Claims, 3 Drawing Sheets

METHOD AND DEVICE FOR SENSORY MEASUREMENT OF A MATERIAL SAMPLE

CROSS-REFERENCE TO RELATED APPLICATIONS

This application makes a claim of priority to German application 102020004838.2, filed on 7 Aug. 2020, which is incorporated by reference as if fully recited herein.

TECHNICAL FIELD

The disclosed invention relates to a method of sensory measurement of a material sample, in particular by thermal analysis.

BACKGROUND ART

Methods of sensory measurement are well known and include, for example, dynamic differential calorimetry (DSC—Differential Scanning Analysis), thermogravimetric analysis (TGA), also combined as simultaneous thermal analysis (TGA/DSC), but also thermomechanical analysis (TMA) or dynamic mechanical analysis (DMA).

In methods of this type, as the user of the method, the operator usually places a material sample to be measured in the measuring apparatus, applies a measuring program or selects one from predetermined measuring programs, and the measurement is carried out on the measuring apparatus.

Not least because of the very high measuring accuracies achieved in the meantime, measuring deviations that lie outside the tolerance limits can result from even small interferences. In some cases there is a malfunction in the measuring apparatus that is already recognized as a malfunction by internal monitoring, whereupon a corresponding warning message is issued in accordance with a predetermined malfunction protocol. If a malfunction is recognized in this way, it can possibly already be remedied by the operator on site or by a service technician called in for this purpose.

In other cases in which the measuring apparatus itself does not report a malfunction, but there may still be initially undetected discrepancies, finding the underlying source of the malfunction is more time-consuming and cannot easily be done by the operator of the measuring apparatus, usually laboratory personnel. Rather, a service technician who is well acquainted with the measuring apparatus will take care of determining the cause of the fault on site. Regardless of whether the service technician subjects the measuring apparatus to an examination based on his or her experience or follows a test scheme, determining the source of the fault repeatedly turns out to be quite time-consuming. The possibility of counteracting this problem by having the service technician log into the control on site using remote control systems such as Team Viewer is generally not permitted by the user. This would also not be expedient because it would result in unfavourable working hours and long idle times for the service technician watching from a distance, having to continuously observe the measurements, some of which run overnight and/or over several hours, for example eight hours at night.

Therefore, it is the object of the invention to develop a system of the type mentioned in such a way that, in the event of malfunctions, the measuring apparatus is brought back to full functionality with less net time expenditure.

SUMMARY OF THE INVENTION

This object is achieved in terms of system technology by means of a method of sensory measurement of a material sample, in particular by thermal analysis, in which the material sample is predetermined and preparatory actions for performing the measurement is carried out by means of an automatically guided operator-machine interaction at a first location and then the measurement takes place at the first location automatically by means of a measuring apparatus while carrying out a predetermined measuring program, wherein by an in particular at least partially automatic comparison of measurement curve sections to which there is an assignment of spheres of influence of sub-units of the measuring apparatus, with reference values and/or courses related to these measurement curve sections, one or more deviations are determined, and from them, in particular, at least in part automatically, a selection of possible causative interference sources present in the form of a deviation of the functional state of one or more of the subunits from their respective target state for the determined deviation is made.

In this case, the invention is based on the knowledge that for a more rapid determination of the responsible source of the interference, a process is first carried out automatically, which costs considerable time, namely carrying out a measurement according to a predetermined measuring program, which can in particular last more than 1 hour. The measuring program preferably even extends over more than 2 hours, in particular more than 3 hours. In a preferred configuration of the method, it runs overnight and extends at least partially over a period of time between 18 h local time at the first location and 8 h the following day.

For the operator at the user there is no loss of working time, he or she can, for example, call up an electronic diagnostic tool before leaving the laboratory, for example on his own initiative or at the request of a service technician after a reported deviation from the target functionality, carry out the necessary preparatory actions, guided by the electronic diagnostic tool, and start the measuring program, which then runs automatically. The diagnostic measuring program can be carried out by measuring a blank or with a defined sample. The diagnostic measuring program can be selected by the operator of the user, but not changed.

To inform the operator of the user that the diagnostic measuring program is running, a warning about the running program is preferably generated and preferably output on a screen of the controller of the measuring apparatus.

Since the subunits of the measuring apparatus have different spheres of influence to the effect that any deviations in their functional status can also be seen in, inter alia, several but assignable sections of the measurement curve, and on the other hand it can be determined at least in a rough estimate or more precisely what types of changes in the functional status a subunit lead to at least qualitatively what kind of changes in one of the assigned measurement curve sections, the selection made of possible causative sources of interference already provides advance knowledge about the measuring apparatus, which is well-founded since it is based on systematic/predetermined measurements actually carried out and, based on this knowledge, service work by a service technician can be approached on site in a more targeted manner or simple adjustments and/or an exchange of (exchangeable) sensors can be carried out by the operator on site. For example, various potential sources of interference are excluded during the selection, which would have had to be be taken into account on the basis of a mere report by an operator about previous laboratory measurements. These include, inter alia, errors made by the operator himself or herself, incorrect device settings/measurement parameters and/or specific error messages generated by the measuring apparatus itself.

Regardless of the extent to which the selection of the possible causative sources of interference is supported automatically, the possibility is created that the service technician who is not on site but remote receives the relevant data, possibly already with pre-evaluation or also in the form of intermediate processing and, optionally, can carry out further analyses remotely from the measurement location, which are nevertheless based on real measurements. In addition, unlike with Team Viewer, a coordinated presence on site and at a distance, which means a need for time on site and in the distance, is no longer necessary. In other words, the measurement carried out in accordance with the predetermined measuring program and the analysis of the measurement results based thereon can be decoupled in terms of time and/or space, and, in particular, is decoupled. The division into measurement curve sections can be configured depending on the instruments/modules utilized for the measurement.

According to a preferred embodiment of the method, at the first location, an inspection of the measuring apparatus takes place at least partially by hand. This follows a provision of a means of transportation to the first location for a person who has received the file at the second location.

The invention also provides a control program which controls carrying out the method according to the invention, as well as a correspondingly equipped and designed measuring apparatus and controller.

Further preferred embodiments are set forth in the dependent claims.

After carrying out the measurement according to the predetermined (diagnostic) measuring program, which is carried out on site by the operator, the measurement results/measurement curves along with assignment to the measuring program performed or identification and/or the information derived therefrom such as the deviations determined and/or the selection made in the form of a file, for example a .zip file, can be compiled, in particular manually or automatically, and transmitted, for example, by the operator to the remote second location, where the measured curves can be evaluated, for example, by a service technician, an evaluation of the curves can be continued. In particular, the file contains characteristics of the modules (sub-units) involved and of the measuring apparatus/instrument.

Specific measuring programs can be predetermined for different measuring apparatuses, such as DSC, TGA, TGA/DSC or also TMA, DMA. The preparatory actions and the measuring program are thus coordinated or tailored to the measuring apparatus, and in a preferred embodiment the electronic diagnostic tool can contain several of the predetermined measuring programs and assign the self-diagnosis started by the operator to a measuring apparatus.

For the measuring apparatus within the meaning of the invention, in addition to the actual measurement sensor, influencing subunits can also be taken into account, which participate in the measurement or contribute to the determination of the ambience of the measurement, such as cooling systems, furnaces, gas supply and their combinations, if available.

During the evaluation, the service technician, for example, can determine whether the measured values are within acceptable tolerance ranges. If an error is detected in a section, the service technician can more easily identify the probable causes (causative sources of interference). In cases where only a limited number of possibilities appear likely as possible sources of interference, feedback information can be returned to the operator on site with this information content, in particular if the measures to remedy these interferences are within the capabilities of the operator. Alternatively or in addition, especially in more difficult cases, the service technician can remedy the situation on site using the prepared spare parts/settings.

Software for performing the diagnostic measuring program can be implemented in a Windows-like manner, for example in the control software (PC software) or device software (firmware), in that the operator clicks on, for example, a tab "Service" and selects below a tab "Diagnosis". The operator is then guided through the necessary preparatory actions in the manner of a "wizard" by following the instructions via an interface of the machine by way of a guided operator-machine interaction. For example, he has to put the cooling device into operation, establish a gas supply connection and ensure that the sensor is cleaned, provide the predetermined material sample, for example a predetermined reference sample, for example a 40 µl aluminium sample. It can also be provided that this sample is measured in a specific, predetermined type of sample crucible. In this context, it can be provided in particular that both the reference side of a sensor (in particular DSC sensor) as well the sample side of the sensor be equipped similarly.

After the preparatory measures have been performed, in a preferred embodiment the operator can also determine a storage location for storing the automatically determined measurement results and any connected primary evaluations.

Finally, the operator can give the start command for the measurement.

In a preferred configuration, the progress over time of the diagnostic measuring program is displayed on a screen, in particular in a warning signature, which prevents operators from interrupting the ongoing diagnostic measuring program.

In a further preferred configuration of the method possible interference sources are switched on/off in an electronically controlled manner in order to check these sources of interference.

The data determined preferably contains the measurement curves, for DSC, for example, the measured temperature curve and the measured heat flow curve. In a preferred configuration, the measured curves are displayed unfiltered, i.e. the filtering that is usually present in application measurements is deactivated. In this way, causes of failure can be identified from slight variations, if necessary, which otherwise would not be detectable due to the filtering.

BRIEF DESCRIPTION OF THE DRAWINGS

The disclosed invention will be better understood when reference is made to the accompanying figures, wherein.

DETAILED DESCRIPTION OF THE DRAWINGS

Figure 1:
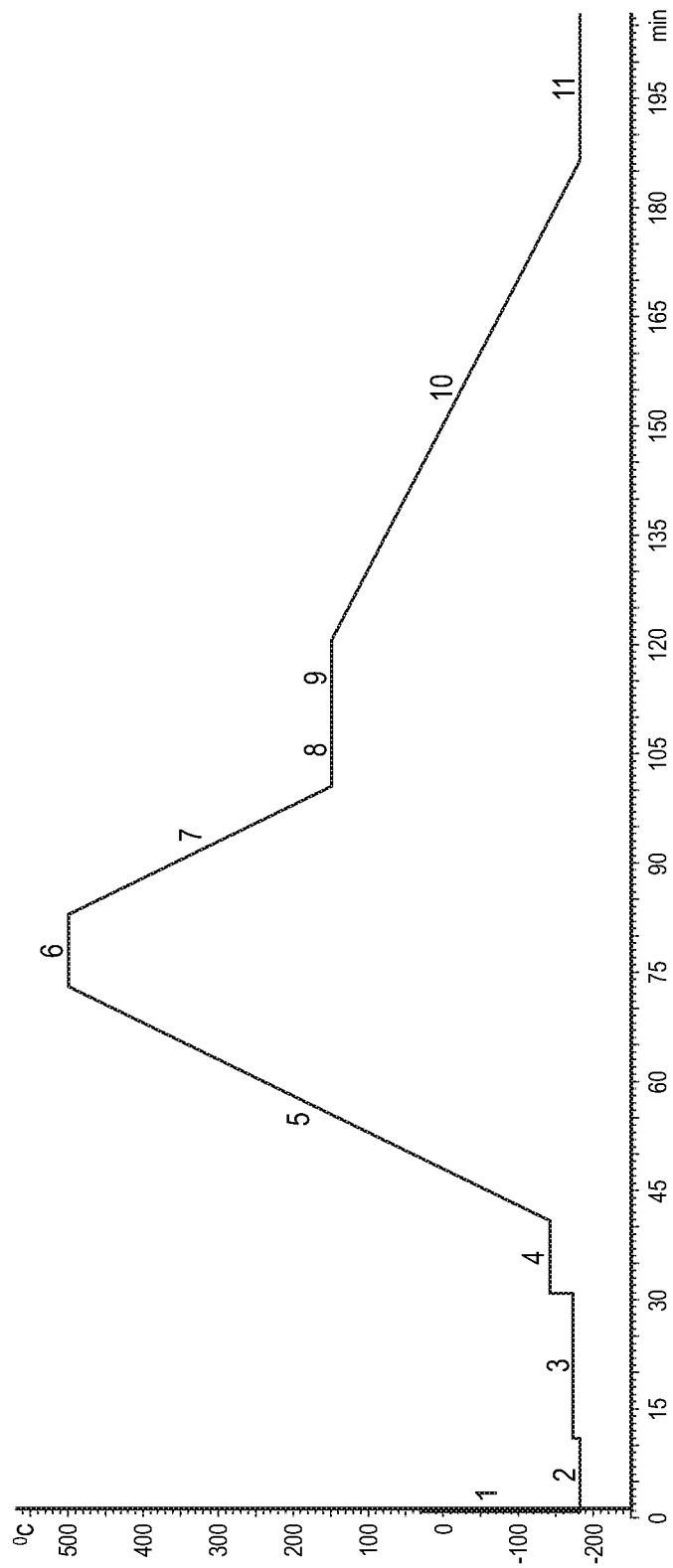
FIG. 1 is a plot of temperature as a function of time for an exemplary thermogravimetric apparatus.

Preferably, at least one curve is generated in a diagram that is suitable for the measurement method, in addition to a time-temperature diagram, also a time-heat flow diagram (for DSC) or, for example, a temperature-mass diagram (TGA), are generated and, in particular, added to the file. In FIG. 1, the attached configuration used for DSC, such a temperature vs. time measurement curve is divided into 11 segments. The initial deflexion in segment 1 can be seen. The lowest attainable temperatures, which provide information about the performance of the cooler, are visible in segments 2 to 4, whereby isothermal drift, noise and distortion are also included in section 4. In section 5, a drift and artifacts can be identified, while in sections 6 and 7 the highest temperatures reached (sphere of influence of heaters and coolers), whereby isothermal drift, noise and distortion can also have an influence in segment 6. Sections 8 and 9 are of interest with regard to noise, as well as with regard to atmospheric control (gas supply), while section 10 can be assigned to a temperature control, whereas isothermal drift, noise and distortion play a role in section 11.

If, for example, a temperature of e.g. −70° is determined in section 4 at an expected temperature of e.g. −85°, the selection of possible sources of interference may include a laboratory temperature that is possibly too high, an insufficient air flow of the cooler, contaminated or blocked filters of the cooling unit, incorrect thermal contact of a cooler flange due to the installation, damaged insulation, an incorrectly installed cooling temperature sensor or damage to the cooling unit.

In a preferred configuration, the temporally subdivided sections of a measurement curve (e.g., temperature) are assigned temporally defined sections of another measurement curve and are examined therein for shifts (drift) and artifacts.

A slow change, the driving force of which is time, is considered to be a "drift". For example, drift, which is a time effect, can be caused by temperature, pressure, aging, position (leveling of the measuring apparatus) or the like. Fast, individual changes that mainly result from mechanical or electronic influences are regarded as artifacts. Oscillating changes, slow or fast, indicate that a quantity involved is getting close to its resonance frequency.

Figure 2:
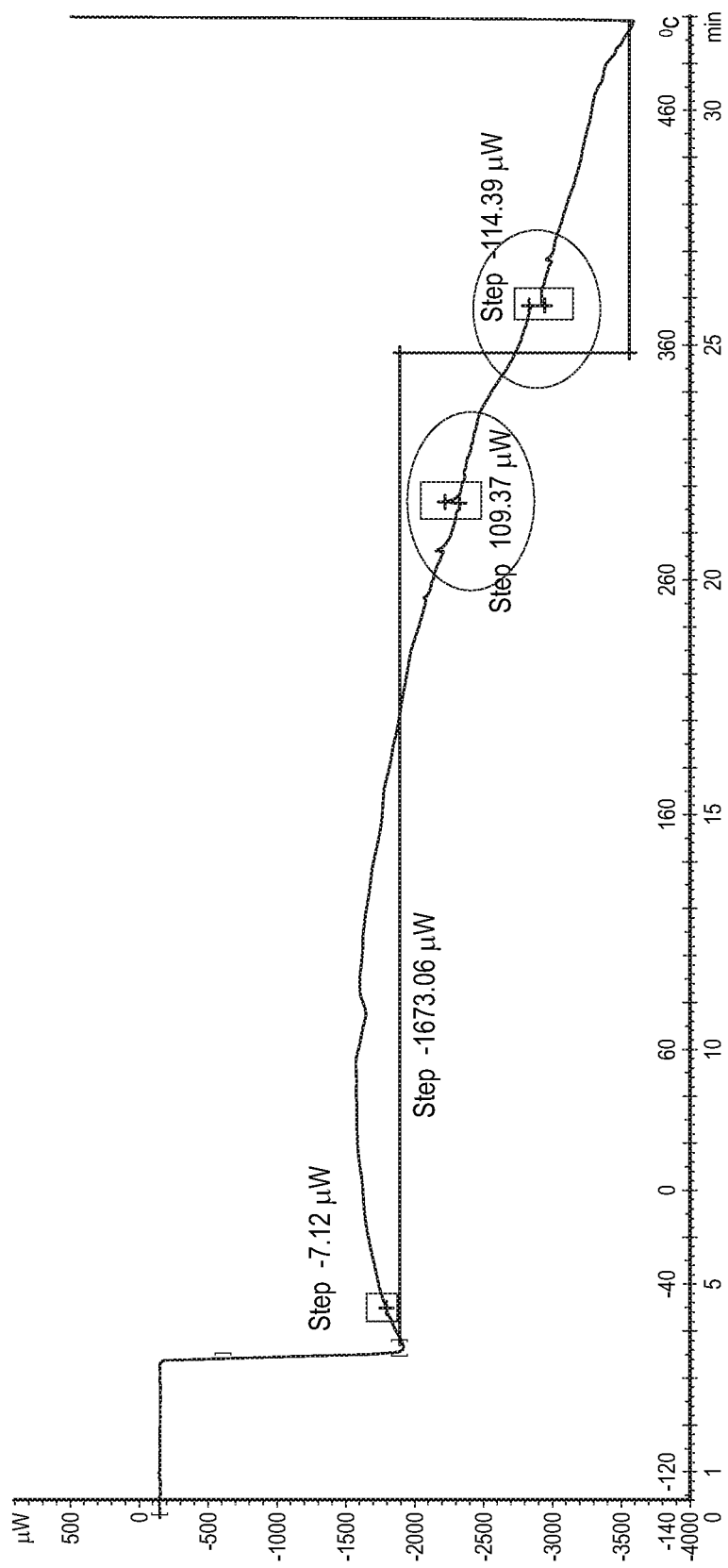
FIG. 2 is a plot of power as a function of time (and also of temperature) for a portion of the FIG. 1 plot.

From the attached illustration of FIG. 2 for section 5 of FIG. 1, for example, from the drift and the artifacts from the heat flow, the following possible causative source of interference are included in the selection: an incorrectly closed furnace lid (mechanical error), an incorrectly closed furnace lid (contamination), a loose sensor, an off-center or twisted sensor, a contaminated sensor, warped crucible, or a sensor that has not been cleaned.

In a deviation from the expected temperature in section 6, the possible causative sources of interference selected would be, for example, impaired cooling capacity, an improperly installed heater at the furnace, a faulty furnace power amplifier, an improperly installed PT100, or an incorrect control voltage for the voltage supply.

Figure 3:
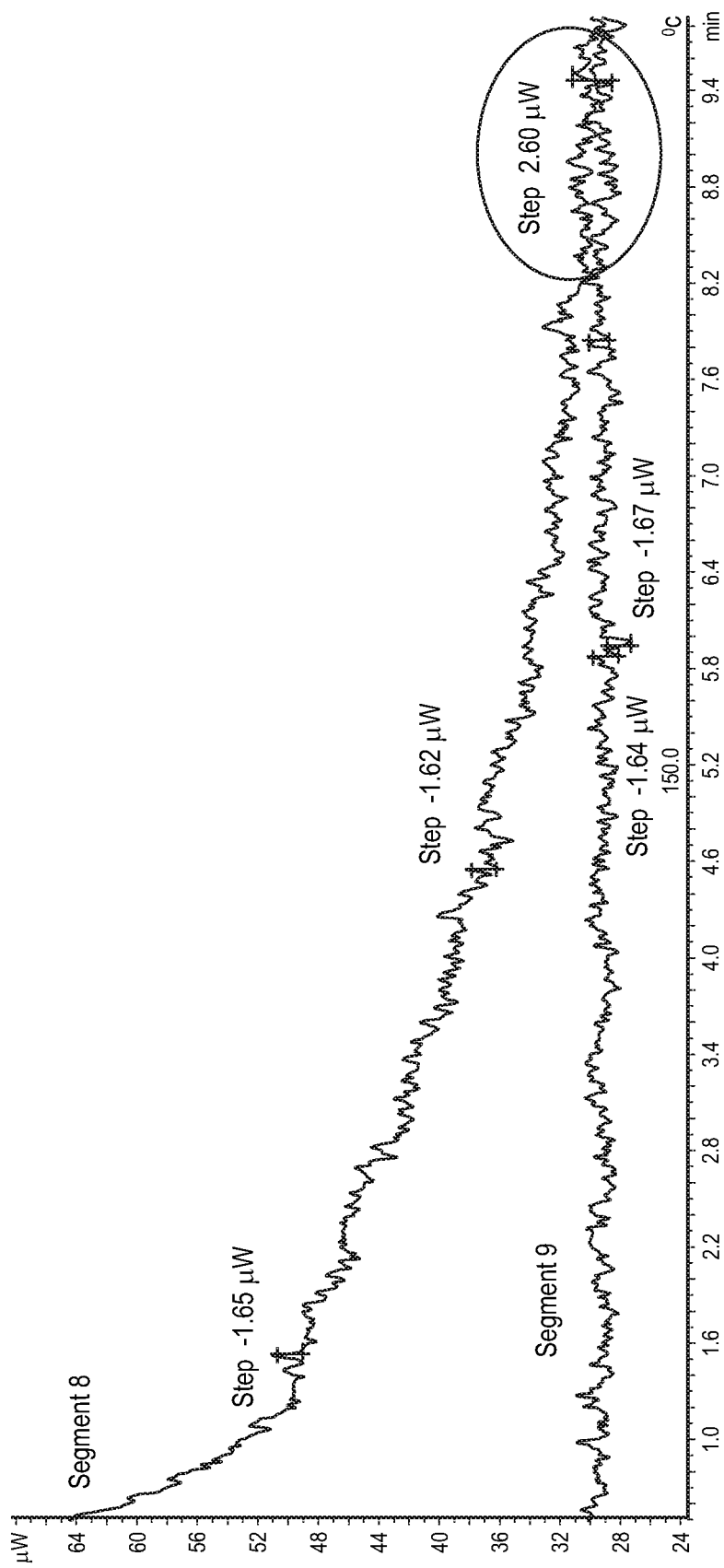
FIG. 3 is a plot of power as a function of elapsed time for two segments of the FIG. 1 plot.

FIG. 3 illustrates the response of heat flow in two different segments of the FIG. 1 data to elapsed time. From the noise in the heat flow in sections 8 and 9 (with and without gas), with section 8 without gas in the upper curve, and section 9 with gas in the lower curve, possible causative sources of interference that can be deduced are an incorrectly closed furnace lid, a loose sensor, a deformed crucible, a furnace that has not been cleaned or problems with the gas supply in general.

From the above it can be seen that the file which is compiled by the electronic diagnostic tool can contain a data record that completely describes the measuring apparatus.

It can also be seen that such an electronic diagnostic tool can be used for various DSC, TGA and TGA/DSC, TMA and DMA instruments.

If the file is transmitted to a distant second location, advance information about performance deviations in a measurement actually performed according to the predetermined measuring program is also available at this location, which allows an evaluating service technician to inform the operator of the measuring apparatus about the (probable) cause. In any case, the service technician is informed in advance by the information received before an on-site inspection and troubleshooting takes place.

In a further preferred configuration repair tools and/or materials are compiled subject to the transmitted file. This reduces the likelihood of any additional on-site appointment.

As apparent from the above, for making the diagnosis and determination of the measurement according to a predetermined measuring program, the presence of the service technician on site is not required.

In a further preferred configuration, the selection function is provided with a learning mode, and there are extensions for additional consideration of other possible additional causes.

In this context it is preferably provided that the selection function is expanded as a function of feedback information containing information about a comparison of an earlier manual check of the measuring apparatus with the previously selected possible causative sources of interference.

The invention is not limited to the features explained by way of example.

What is claimed is:

1. A method of sensory measurement of a predetermined material sample, the method comprising the steps of:
   providing a measuring apparatus comprising sub-units at a first location;
   providing a means for automatically guided operator-machine interaction at the first location;
   pre-assigning spheres of influence of sub-units of the measuring apparatus to sections of a measurement curve to be generated by the measuring apparatus carrying out a predetermined measuring program;
   predetermining reference values for the sections of the measurement curve;
   carrying out of preparatory actions for performing a measurement with the measuring apparatus by the means for the automatically guided operator-machine interaction;
   using the measuring apparatus to carry out a predetermined measuring program to perform the measurement automatically at the first location and to generate the measurement curve, comprising a plurality of sections;
   comparing, in an at least partially automated fashion, the sections of the generated measurement curve to the predetermined reference values for the sections of the measurement curve using a control program running on the measuring apparatus or on a controller;
   determining, from the comparing step, one or more deviations of the generated measurement curve using the control program running on the measuring apparatus or on the controller; and
   making, in an at least partially automated fashion, a selection of possible sources of causative interference for the determined deviations using the control program running on the measuring apparatus or on the controller, wherein the sources of causative interference are deviation of the functional state of at least one sub-unit of the measuring apparatus from a target state.

2. The method of claim 1, further comprising the steps of:
   automatically compiling a file that comprises at least the measurement curve(s) and/or the possible interference sources using the control program running on the measuring apparatus or on the controller; and transmitting the compiled file to a second location remote from the first location for further evaluation.

3. The method of claim 2, wherein the compiled file further comprises information about identity and/or characteristics of the measuring apparatus and/or its sub-units, and/or including its time profile during the measurement, an identification of the first location, the measurement curve(s) and/or measurement logs of the measurement performed at the first location.

4. The method of claim 2, wherein, any one of the following steps are carried out without any actions originating from the second location that would influence the steps:
predetermining the material sample and carrying out the preparatory actions;
performing the measurement automatically; and
compiling the file.

5. The method of claim 2, wherein, all of the following steps are carried out without any actions originating from the second location that would influence the steps:
predetermining the material sample and carrying out the preparatory actions;
performing the measurement automatically; and
compiling the file.

6. The method of claim 2, wherein the second location has no access to an electronic platform for issuing instructions regarding any of the of steps of:
predetermining the material sample and carrying out preparatory actions; and
performing the measurement or compiling the file.

7. The method of claim 2, comprising the steps of:
receiving the file at the second location and evaluating the measurement curves in the file;
preparing spare parts and/or settings at the second location based on the evaluation; and
using the spare parts and/or settings to remove sources of causative interference at the first location.

8. The method of sensory measurement of claim 1, wherein the sensory measurement comprises a thermal analysis.

9. A control software, which, when executed on a measuring apparatus for sensory measurement of a material sample causes the measuring apparatus to perform the method according to claim 1.

10. A control software, which, when executed on a measuring apparatus for sensory measurement of a material sample, causes the measuring apparatus to perform the method according to claim 2.

11. A device for sensory measurement of a material sample, with the control software according to claim 9.

12. The device for sensory measurement of a material sample according to claim 11, said the comprising:
a controller for guiding the operator-machine interaction; and
a measuring apparatus for carrying out the measuring;
wherein the control software comprises instruction, which when executed, causes the controller to execute, the comparison of the measurement curve sections or the making of the selection of possible sources of causative interference.

13. A device for sensory measurement of a material sample, with the control software according to claim 10.

14. The device for sensory measurement of a material sample, according to claim 13, said device comprising:
a controller for guiding the operator-machine interaction; and
a measuring apparatus for carrying out the measuring;
wherein the control software comprises instruction, which when executed, causes the controller to execute said comparison of the measurement curve sections, said making of the selection of possible sources of causative interference, and the compiling of the file.

15. The device according to claim 14, wherein the controller executes the compiling of the file such that the file comprises:
at least the measurement curve(s) and/or the possible interference sources; and
information about identity and/or characteristics of the measuring apparatus and/or its sub-units, wherein the controller is configured to transmit the compiled file to a second location remote from the first location for further evaluation.

16. A system for sensory measurement of a material sample, said system comprising:
a measuring apparatus comprising sub-units, whereby the measuring apparatus is designed for carrying out a predetermined measuring program;
means for automatically guided operator-machine interaction to perform preparatory actions for performing the measurement; and
a controller which controls the measuring apparatus following the performance of the preparatory actions by the means for the automatically guided operator-machine interaction to perform the measurement according to the predetermined measuring program on a blank or with a defined sample, wherein the controller is configured to:
determine one or more deviations, by an at least partially automatic comparison of measurement curve sections to which there is an assignment of spheres of influence of sub-units of the measuring apparatus, with reference values and/or courses related to these measurement curve sections; and
based upon the determined deviations, and in an at least in partially automated fashion, make a selection of possible causative interference sources present in the form of a deviation of the functional state of one or more of the subunits from their respective target state for the determined deviation.

17. The system according to claim 16, wherein the controller is configured to carry out a method comprising the steps of:
guiding an operator to carrying out of preparatory actions for performing a measurement with the measuring apparatus by way of a guided operator-machine interaction;
running a predetermined measuring program, including causing the measuring apparatus to perform the measurement automatically at the first location and to generate a measurement curve, comprising a plurality of sections;
comparing, in an at least partially automated fashion, sections of the generated measurement curve to the predetermined reference values for the sections of the measurement curve using a control program running on the controller;
determining, from the comparing step, one or more deviations of the generated measurement curve using the control program running on the controller; and
making, in an at least partially automated fashion, a selection of possible sources of causative interference for the determined deviations using the control program running on the controller, wherein the sources of causative interference are deviation of the functional state of at least one sub-unit of the measuring apparatus from a target state.

18. The device for sensory measurement of a material sample according to claim 12 where the measurement apparatus is a thermal analyser.

19. The method of claim 1 further comprising: using the measurement to obtain one measurement curve, where the one measurement curve is divided into a plurality of measurement curve sections.

* * * * *

UNITED STATES PATENT AND TRADEMARK OFFICE
CERTIFICATE OF CORRECTION

PATENT NO. : 12,209,981 B2  
APPLICATION NO. : 17/444581  
DATED : January 28, 2025  
INVENTOR(S) : Jörimann et al.

Page 1 of 1

It is certified that error appears in the above-identified patent and that said Letters Patent is hereby corrected as shown below:

In the Claims

In Column 7, Line 51, Claim 12, delete "said the" and insert -- said device --.

In Column 7, Line 56, Claim 12, delete the "," after "execute".

In Column 7, Line 61, Claim 13, delete the "," after "sample".

Signed and Sealed this  
Fourth Day of March, 2025

Coke Morgan Stewart  
*Acting Director of the United States Patent and Trademark Office*